UNITED STATES PATENT OFFICE.

FREDERICK KNIFFEN, OF WILMINGTON, DELAWARE, ASSIGNOR TO E. I. DU PONT DE NEMOURS POWDER COMPANY, OF WILMINGTON, DELAWARE, A CORPORATION OF NEW JERSEY.

PYROXYLIN SOLVENT.

1,118,498.  Specification of Letters Patent.  Patented Nov. 24, 1914.

No Drawing.   Application filed October 28, 1912.   Serial No. 728,065.

*To all whom it may concern:*

Be it known that I, FREDERICK KNIFFEN, of Wilmington, in the county of New Castle, and in the State of Delaware, have invented a certain new and useful Improvement in Pyroxylin Solvents, and do hereby declare that the following is a full, clear, and exact description thereof.

The object of my invention has been to provide a process of forming pyroxylin bodies, and a pyroxylin solvent having, among others, the qualities of being cheap, of high solvent power, free from precipitation of pyroxylin, nonhygroscopic, and of pleasant odor, and to such ends my invention consists in the process of forming pyroxylin bodies, and the pyroxylin solvent hereinafter specified.

In the pyroxylin industries, such as in the manufacture of lacquers, artificial leather, varnishes, etc., there is a demand for a solvent having the above stated qualities. None of the ordinary pyroxylin solvents, such as glacial acetic acid, amyl acetate, wood alcohol, acetone with its homologues and derivatives, is perfect in all these properties, except, perhaps, amyl acetate, and as to this latter solvent, its price is prohibitive. In each of these industries, it is desirable to have the relative proportions of the solvent and pyroxylin vary to get a solution of a given strength, according to the nature of the film to be formed by depositing the pyroxylin. For instance, in lacquer work, the solution should not contain over five ounces of pyroxylin per gallon in order that a film of proper thickness may be deposited. In some of the decorative arts, a very heavy film is employed which could be deposited from a solution containing as high as twenty ounces of pyroxylin per gallon. There is thus for each industry a strength of solution which is best adapted thereto. Where a solution is desired having less pyroxylin than the total amount which the solvent is capable of taking up (for instance, if a solution of twenty ounces of pyroxylin to a gallon of solvent were desired, which is less than the total amount which the solvent would take up), it is unnecessary to have the entire gallon of solution composed of pure solvent, it only being necessary to have enough solvent present to dissolve the desired amount of pyroxylin. For economy, therefore, it is customary to add cheap diluents to the solvent, which diluents are either entirely non-solvent or nearly so. The use of diluents, however, introduces difficulties, among which may be mentioned the following: When, as used in a factory, these solvents are evaporated in contact with the ordinary room atmosphere (in order to deposit a film of pyroxylin), there is a tendency, except as to amyl acetate, toward a separation out of the nitrocellulose or other solvents through absorption of moisture from the air or through the change in the composition of the solvent mixture resulting from the unequal rate of evaporation of its components, this precipitation being usually evidenced by the appearance of a whitish substance, technically known as "blushing" or "blooming," or by the settling to the bottom of a jellylike mass. Such separation tends to decrease the strength of the film and, in some cases, the white appearance produces objectionable color effects.

I have discovered that by using ethyl acetate as the solvent and benzol as the diluent (with or without other components), a mixture is obtained which has a maximum solvent power and is free from precipitation of the pyroxylin. Such mixture is also comparatively non-hygroscopic. When these two materials are mixed together, the reduction in solvent power of the active principal, ethyl acetate, is so far resisted that the mixture may contain as high as seventy per cent., or even higher, of benzol. I find that during evaporation under ordinary factory conditions, the ethyl acetate and benzol mixture deposits a film which is strong and transparent. I find that a solution containing about eight ounces of pyroxylin and equal parts of ethyl acetate and benzol, is suitable for most general applications, and except where the humidity and temperature are high, the solution may contain as high as twenty-four ounces of pyroxylin per gallon. Equal parts of the ethyl acetate and benzol constitute a normal solvent of ready general applicability, but the relative percentages of these ingredients may vary widely according to the conditions covering the innumerable uses to which the solution may be put. I have given specific instances merely by way of illustration, and am not to be confined to the particular proportions given, as they are to be regarded as typical only. An increase in the benzol component results in reduced cost, and its disadvantage lies in the less rapid solvent action which such a mixture would possess.

Numerous other substances, such as oils, pigments, gums, resins, etc., may be added to the pyroxylin mixture, each having its own properties, and these properties will, of course, affect the properties of the final mixture, but the general principle will still obtain.

As the boiling points of the ethyl acetate and benzol are in the same neighborhood, it is not necessary to raise the temperature of either much above the other in order to secure evaporation of the solvent solution. This possesses the advantage that the vapor tension of neither constituent is required to be higher than is desirable to produce evaporation of that particular constituent. This capability of low vapor tension in evaporation is very desirable since the evaporation always takes place within an apparatus, and one which is usually large, and there is a tendency for the vapor to escape from the apparatus if the vapor tension is at all high.

I find that my mixture is comparatively non-hygroscopic, which is a very desirable quality, since the absorption of water in such a solution results in a precipitation of the pyroxylin.

I claim:

1. A solvent for pyroxylin comprising ethyl acetate and benzol.

2. A solvent for pyroxylin comprising substantially equal parts of ethyl acetate and benzol.

In testimony that I claim the foregoing I have hereunto set my hand.

FREDERICK KNIFFEN.

Witnesses:
P. E. STRICKLAND,
JOHN E. EMMONS.